United States Patent
Vanhoucke

(10) Patent No.: US 11,550,871 B1
(45) Date of Patent: *Jan. 10, 2023

(54) PROCESSING STRUCTURED DOCUMENTS USING CONVOLUTIONAL NEURAL NETWORKS

(71) Applicant: Google LLC, Mountain View, CA (US)

(72) Inventor: Vincent O. Vanhoucke, San Francisco, CA (US)

(73) Assignee: Google LLC, Mountain View, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 16/544,717

(22) Filed: Aug. 19, 2019

Related U.S. Application Data

(63) Continuation of application No. 14/829,525, filed on Aug. 18, 2015, now Pat. No. 10,387,531.

(51) Int. Cl.
| | |
|---|---|
| *G06N 3/04* | (2006.01) |
| *G06F 16/958* | (2019.01) |
| *G06F 40/174* | (2020.01) |
| *G06V 30/413* | (2022.01) |

(52) U.S. Cl.
CPC .......... *G06F 16/986* (2019.01); *G06F 40/174* (2020.01); *G06N 3/04* (2013.01); *G06V 30/413* (2022.01)

(58) Field of Classification Search
None
See application file for complete search history.

(56) References Cited

U.S. PATENT DOCUMENTS

| | | | |
|---|---|---|---|
| 9,530,047 B1* | 12/2016 | Tang | G06V 30/194 |
| 10,387,531 B1 | 8/2019 | Vanhoucke | |
| 2007/0005977 A1* | 1/2007 | Tohne | H04N 1/32352 |
| | | | 713/176 |
| 2007/0185871 A1* | 8/2007 | Canright | G06F 16/951 |
| | | | 707/E17.08 |

(Continued)

OTHER PUBLICATIONS

Bosch et al., "A Review: Which is the Best Way to Recognize/Classify Images by Content?", Jul. 12, 2006, Image and Vision Computing, pp. 1-14 (Year: 2006).

(Continued)

*Primary Examiner* — Paulinho E Smith
(74) *Attorney, Agent, or Firm* — Fish & Richardson P.C.

(57) ABSTRACT

Structured documents are processed using convolutional neural networks. For example, the processing can include receiving a rendered form of a structured document; mapping a grid of cells to the rendered form; assigning a respective numeric embedding to each cell in the grid, comprising, for each cell: identifying content in the structured document that corresponds to a portion of the rendered form that is mapped to the cell, mapping the identified content to a numeric embedding for the identified content, and assigning the numeric embedding for the identified content to the cell; generating a matrix representation of the structured document from the numeric embeddings assigned to the cells of the grids; and generating neural network features of the structured document by processing the matrix representation of the structured document through a subnetwork comprising one or more convolutional neural network layers.

20 Claims, 5 Drawing Sheets

(56) References Cited

U.S. PATENT DOCUMENTS

| | | | | |
|---|---|---|---|---|
| 2008/0082907 | A1* | 4/2008 | Sorotokin | G06F 40/106 715/209 |
| 2013/0174010 | A1* | 7/2013 | Le Chevalier | G06F 40/154 715/234 |
| 2013/0290222 | A1* | 10/2013 | Gordo | G06K 9/6259 707/769 |
| 2015/0186742 | A1* | 7/2015 | Murray | G06K 9/629 382/190 |
| 2016/0063359 | A1* | 3/2016 | Szegedy | G06N 3/0454 382/158 |
| 2016/0180151 | A1* | 6/2016 | Philbin | G06K 9/6256 382/118 |
| 2017/0011279 | A1* | 1/2017 | Soldevila | G06V 30/194 |
| 2017/0200076 | A1* | 7/2017 | Vinyals | G06N 3/0445 |
| 2017/0300814 | A1* | 10/2017 | Shaked | G06N 3/084 |
| 2018/0053042 | A1* | 2/2018 | Philbin | G06N 3/0454 |

OTHER PUBLICATIONS

Chellapilla et al., "High Performance Convolutional Neural Networks for Document Processing," Tenth International Workshop on Frontiers in Handwriting Recognition, Oct. 2006, 7 pages.

Frome et al., "DeViSE: A Deep Visual-Semantic Embedding Model," Advances in Neural Information Processing Systems 26, pp. 2121-2129, 2013.

Kalchbrenner et al., "A Convolutional Neural Network for Modelling Sentences," arXiv:1404.2188v1 [cs.CL], Apr. 2014.

Le and Mikolov, "Distributed Representations of Sentences and Documents," arXiv:1405.4053v2 [cs.CL], May 2014, pp. 1-9.

Mikolov et al., "Efficient estimation of word representations in vector space," arXiv:1301.3781v3 [cs.CL], Sep. 2013, pp. 1-12.

Sutskever et al., "Sequence to sequence learning with neural networks," Advances in neural Information processing systems, Sep. 2014, pp. 1-9.

Unknown Author, "Convolutional Neural Networks (LeNet)," DeepLearning, Aug. 2015 [retrieved on Aug. 24, 2015]. Retrieved from the Internet: URL<http://deeplearning.net/tutorial/lenet.html>, 11 pages.

Unknown Author, "Recurrent Neural Networks with Word Embeddings," DeepLearning, Aug. 2015 [retrieved on Aug. 24, 2015]. Retrieved from the Internet: URL<http://deeplearning.net/tutorial/rnnslu.html>, 6 pages.

Unknown Author, "Word embedding," Wikipedia, the free encyclopedia, Jun. 22, 2015 [retrieved on Aug. 24, 2015]. Retrieved from the Internet: URL<https://en.wikipedia.org/wiki/Word_embedding>, 2 pages.

Vinyals et al., "Show and Tell: A Neural Image Caption Generator," arXiv:1411.4555v2 [cs.CV], Apr. 2015.

Wang et al., "Learning fine-grained image similarity with deep ranking," Computer Vision and Pattern Recognition (CVPR), 2014 IEEE Conference on IEEE, Apr. 2014, pp. 1-7.

Weston et al., "WSABIE: Scaling Up To Large Vocabulary Image Annotation," IJCAI'11 Proceedings of the Twenty-Second international joint conference on Artificial Intelligence—vol. Three, pp. 2764-2770, 2011.

* cited by examiner

PROCESSING STRUCTURED DOCUMENTS USING CONVOLUTIONAL NEURAL NETWORKS

CROSS-REFERENCE TO RELATED APPLICATION

This is a continuation of U.S. application Ser. No. 14/829,525, filed on Aug. 18, 2015, the disclosure of which is considered part of and is incorporated by reference in the disclosure of this application.

BACKGROUND

This specification relates to processing structured documents using neural networks.

Neural networks are machine learning models that employ one or more layers of nonlinear units to predict an output for a received input. Some neural networks include one or more hidden layers in addition to an output layer. The output of each hidden layer is used as input to one or more other layers in the network, e.g., the next hidden layer, the output layer, or both. Each layer of the network generates an output from a received input in accordance with current values of a respective set of parameters.

Convolutional neural networks are neural networks that include one or more convolutional layers. Convolutional layers are generally sparsely-connected neural network layers. That is, each node in a convolutional layer receives an input from a portion of, i.e., less than all of, the nodes in the preceding neural network layer or, if the convolutional layer is the lowest layer in the sequence, a portion of an input to the neural network, and produces an activation from the input. Generally, convolutional layers have nodes that produce an activation by convolving received inputs in accordance with a set of weights for each node. In some cases, nodes in a convolutional layer may be configured to share weights. That is, all of or a portion of the nodes in the layer may be constrained to always have the same weight values as the other nodes in the layer. Convolutional layers are generally considered to be well-suited for processing images because of their ability to extract features from an input image that depend on the relative location of the pixel data in the input image.

SUMMARY

In general, one innovative aspect of the subject matter described in this specification can be embodied in methods that include the actions of receiving a rendered form of a structured document; mapping a grid of cells to the rendered form; assigning a respective numeric embedding to each cell in the grid, comprising, for each cell: identifying content in the structured document that corresponds to a portion of the rendered form that is mapped to the cell, mapping the identified content to a numeric embedding for the identified content, and assigning the numeric embedding for the identified content to the cell; generating a matrix representation of the structured document from the numeric embeddings assigned to the cells of the grids; and generating neural network features of the structured document by processing the matrix representation of the structured document through a subnetwork comprising one or more convolutional neural network layers.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. Classification data for a structured document can be effectively determined by generating a matrix representation of the structured document that can be processed by a convolutional neural network. Because the matrix representation reflects relative locations of content in the structured document when the structured document is in a rendered form, the ability of a convolutional neural network to extract features from inputs that reflect relative positions of data in the input can be leveraged to generate accurate features of the structured document, resulting in more accurate classification of the structured document.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
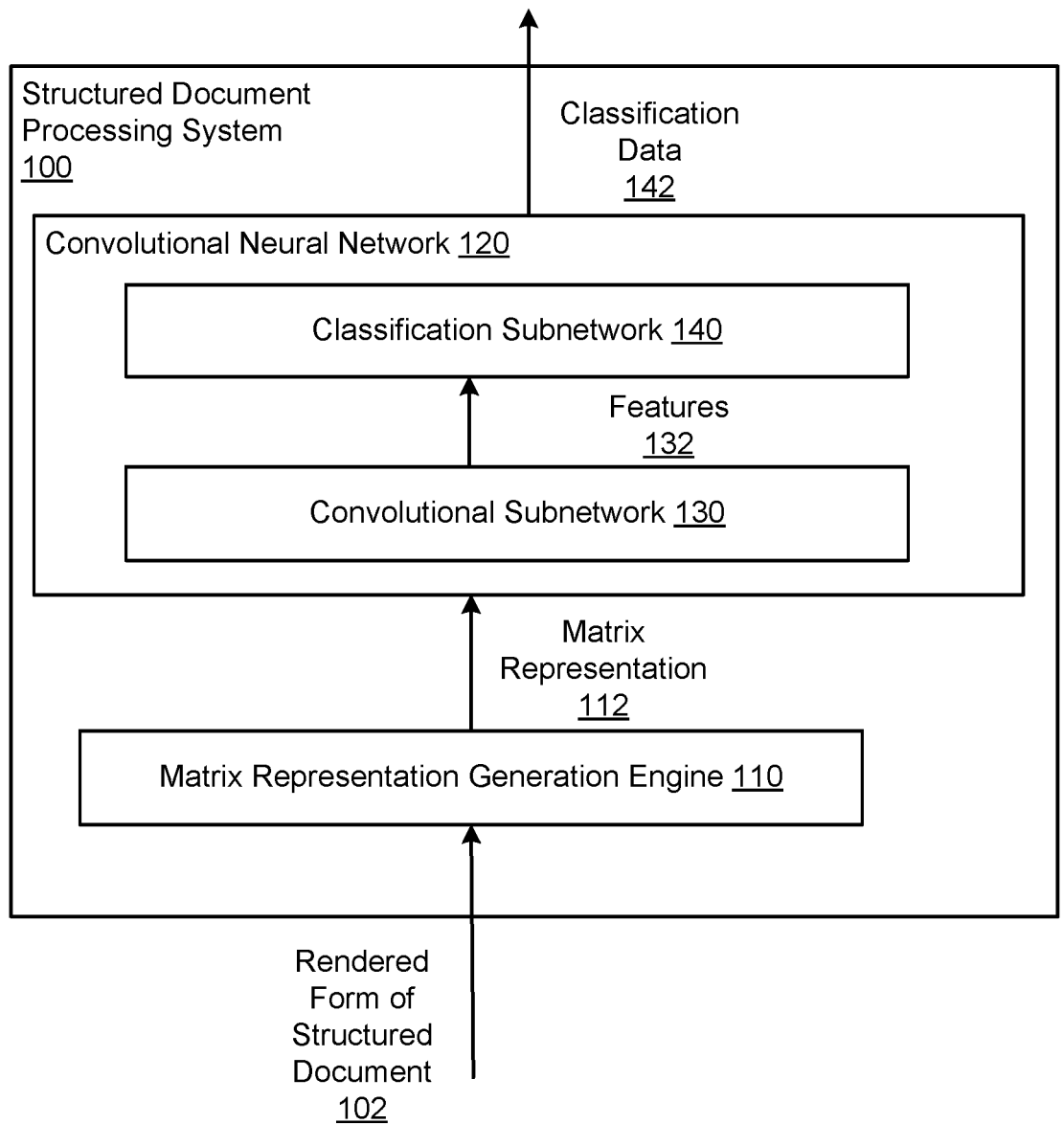
FIG. 1 shows an example document processing system.

FIG. 1 shows an example document processing system 100. The document processing system 100 is an example of a system implemented as computer programs on one or more computers in one or more locations, in which the systems, components, and techniques described below can be implemented.

The document processing system 100 generates classification data for an input structured document by generating a matrix representation of the structured document and processing the matrix representation using a convolutional neural network 120. The convolutional neural network 120 can be configured, i.e., through training, to generate any of various kinds of classification data for the input structured document.

For example, the convolutional neural network 120 can be configured to generate classification data that represents a likelihood that content in a particular portion of a rendered form of the structured document will be selected by a user viewing the rendered form of the structured document.

As another example, the convolutional neural network 120 can be configured to generate classification data that includes a respective score for each of a set of possible document topics, with the score for a given document topic representing a likelihood that the structured document includes content relating to the topic.

As another example, the convolutional neural network 120 can be configured to generate classification data that includes a respective score for each of a set of portions in the rendered form of the structured document, with the score for a given portion representing a likelihood that the portion is the most relevant portion to a given search query. As another example, the score for a given portion may represent the likelihood that the portion includes document content and not a layout element or an inserted advertisement or other add-on content. As another example, the score for a given portion may represent the likelihood that the portion includes contextual information for an image in a different portion of the structured document. As another example, the score for a given portion may represent the likelihood that the portion is located in a particular position in a hierarchy in the structured document. Example positions in the hierarchy may include the title of the document, a particular section in the document, a subsection of the particular section in the document, and so on.

In particular, the document processing system 100 includes a matrix representation generation system 110 that receives a rendered form of a structured document, e.g., a rendered form 102, and generates a matrix representation of the structured document using the rendered form, e.g., a matrix representation 112 generated from the rendered form 102. Generally, the matrix representation is a numeric representation of the structured document that reflects the relative location of content from the structured document when the structured document is in the rendered form and that can effectively be received as an input by a convolutional neural network, e.g., the convolutional neural network 120.

The convolutional neural network 120 includes a convolutional subnetwork 130 and a classification subnetwork 140.

The convolutional subnetwork 130 includes one or more convolutional layers and, optionally, one or more other neural network layers of other types, e.g., pooling layers, normalization layers, fully-connected layers, batch normalization layers, and so on.

Convolutional layers are generally sparsely-connected neural network layers. That is, each node in a convolutional layer receives an input from a portion of, i.e., less than all of, the nodes in the preceding neural network layer or, if the convolutional layer is the lowest layer in the sequence, a portion of an input to the neural network, and produces an activation from the input. Generally, convolutional layers have nodes that produce an activation by convolving received inputs in accordance with a set of weights for each node. In some cases, nodes in a convolutional layer may be configured to share weights. That is, all of or a portion of the nodes in the layer may be constrained to always have the same weight values as the other nodes in the layer.

Generally, the convolutional subnetwork 130 is configured to receive a matrix representation of a structured document, e.g., the matrix representation 112, and to process the matrix representation through each of the layers in the convolutional subnetwork 130 to generate neural network features of the structured document, e.g., neural network features 132 from the matrix representation 112.

The neural network features generated by the convolutional subnetwork 130 may be, e.g., the output of the last layer in the convolutional subnetwork 130 or a combination of the outputs of multiple ones of the layers in the convolutional subnetwork 130, e.g., an average, a sum, or a concatenation of the outputs of the layers. By virtue of the convolutional subnetwork 130 including one or more convolutional layers and the matrix representation reflecting relative locations of content in the rendered form of the structured document, the neural network features generated by the convolutional subnetwork 130 are also dependent on the relative locations of the content in the rendered form.

The classification subnetwork 140 includes one or more neural network layers that are configured to receive neural network features of given structured document, e.g., the features 132, and to collectively process the features to generate classification data for the structured document from the features, e.g., classification data 142 from the features 132. Generally, the classification subnetwork 140 includes an output layer and, optionally, one or more other neural network layers. If the classification subnetwork 140 includes only an output layer, the output layer receives the features and processes the features to generate the classification data. If the classification subnetwork 140 includes one or more other neural network layers, the other neural network layers are configured to receive the features and to collectively process the features to generate an alternative representation of the features. The output layer then processes the alternative representation generated by the other neural network layers to generate the classification data.

Depending on the context of use of the convolutional neural network 120, the output layer may be any of various kinds of conventional neural network output layers. For example, if the convolutional neural network 120 is configured to generate classification data that represents a likelihood that content in a particular portion of a rendered form of a structured document will be selected by a user viewing the rendered form of the structured document, the output layer may be a logistic regression output layer that receives the alternative representation or the neural network features and generates a score that represents the likelihood. As another example, if the convolutional neural network 120 is configured to generate classification data that includes a respective score for each of a set of possible document topics, with the score for a given document topic representing a likelihood that the structured document includes content relating to the topic, the output layer may be a softmax output layer that receives the alternative representation or the neural network features and generates the scores for the possible document topics.

Figure 2:
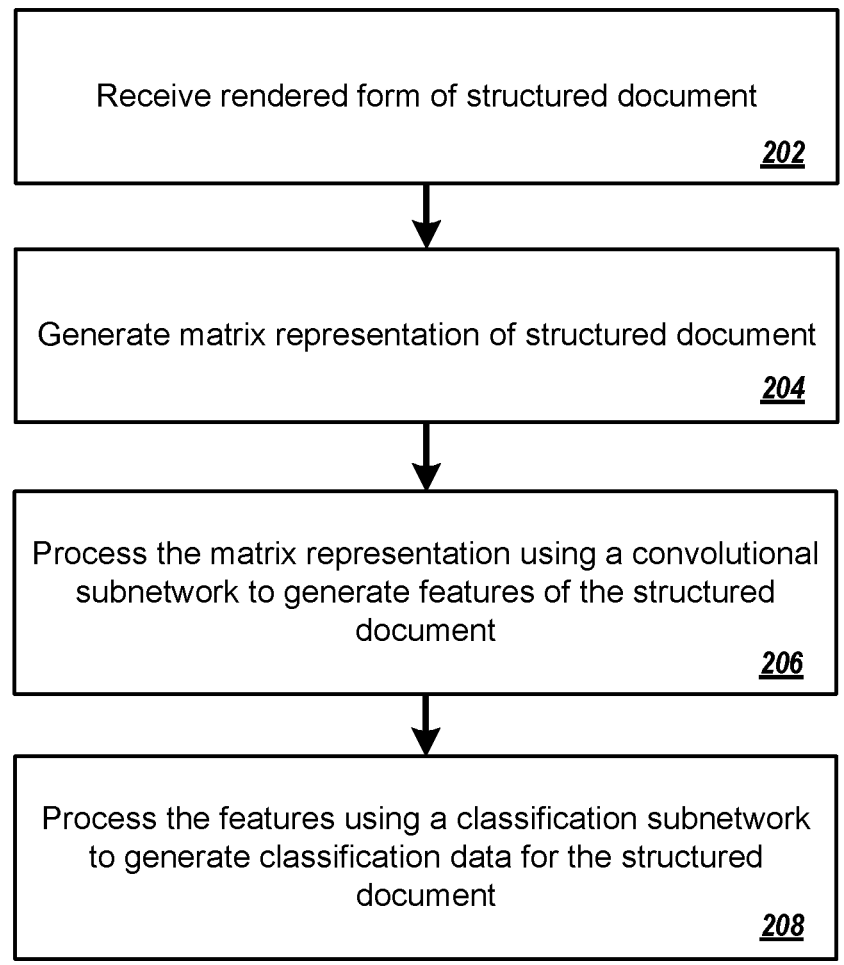
FIG. 2 is a flow diagram of an example process for generating classification data for a structured document.

FIG. 2 is a flow diagram of an example process 200 for generating classification data for a structured document. For convenience, the process 200 will be described as being performed by a system of one or more computers located in one or more locations. For example, a document processing system, e.g., the document processing system 100 of FIG. 1, appropriately programmed, can perform the process 200.

The system receives a rendered from of the structured document (step 202).

The system generates a matrix representation of the structured document (step 204). Generally, the matrix representation includes data from numeric embeddings of content in the structured document and is generated so that it takes into account the location of the content in the rendered form of the structured document. Each numeric embedding is a vector of numeric values, e.g., floating point values or quantized floating point values, that has a predetermined dimensionality, i.e., each vector includes a predetermined number of values.

In some implementations, the matrix representation is multiple matrices, with each of the matrices including values at the same position in the numeric embeddings of the content from the structured document. That is, in these implementations, the i-th matrix will include values only from the i-th position in each of the numeric embeddings. In other words, the matrix representation may be a tensor having two spatial dimensions and one embedding dimension.

Generating a matrix representation of a structured document is described in more detail below with reference to FIGS. 3 and 4.

The system processes the matrix representation using a convolutional subnetwork to generate neural network features of the structured document (step 206). The convolutional subnetwork includes one or more convolutional layers and, optionally, one or more layers of other types of neural network layers. The features of the structured document may be, e.g., the output of the last, i.e., highest, layer in the convolutional subnetwork, or a combination of the outputs of multiple layers in the convolutional subnetwork. Because the convolutional subnetwork includes one or more convolutional layers and because the matrix representation takes into account the relative locations of content in the rendered form, the neural network features of the structured document also depend on the relative locations of the content in the rendered form. That is, the neural network features for two structured documents that include the same content but located in different positions when the structured documents are in their rendered form may be different.

The system processes the neural network features of the structured document using a classification subnetwork to generate classification data for the structured document (step 208). The classification subnetwork includes an output layer and, optionally, one or more other neural network layers and is configured to receive the neural network features and to process the features to generate the classification data for the structured document. As described above, the classification data that the classification subnetwork is configured to generate will generally depend on the context of use of the system.

In some implementations, in addition to or instead of processing the neural network features using the classification subnetwork, the system stores the features for later use, e.g., by storing the features in a repository and associating the features with data identifying the structured document, or provides the features to another system for use as features of the structured document.

Figure 3:
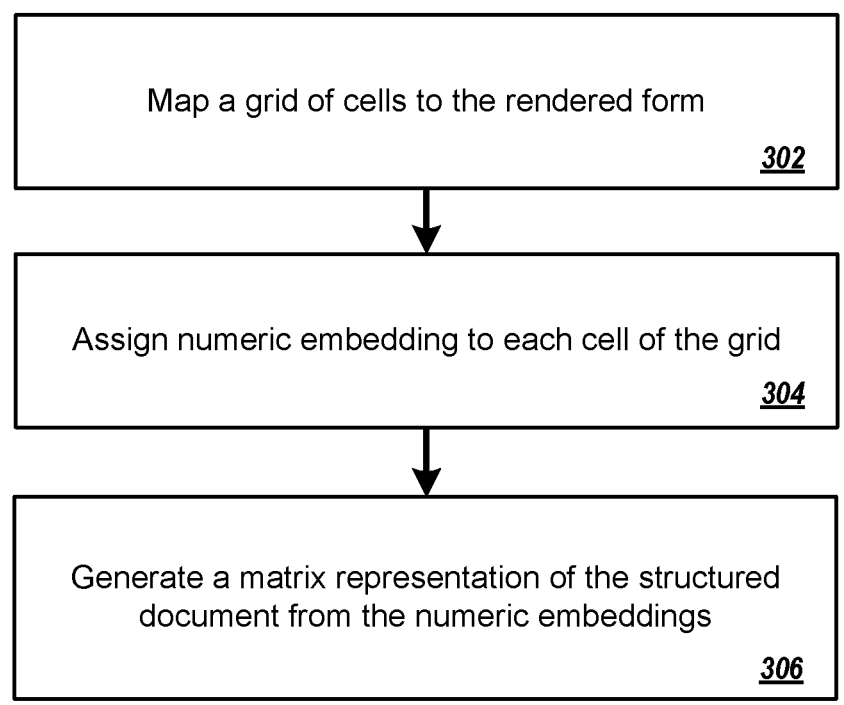
FIG. 3 is a flow diagram of an example process for generating a matrix representation of a structured document.

FIG. 3 is a flow diagram of an example process 300 for generating a matrix representation of a structured document. For convenience, the process 300 will be described as being performed by a system of one or more computers located in one or more locations. For example, a document processing system, e.g., the document processing system 100 of FIG. 1, appropriately programmed, can perform the process 300.

The system maps a grid of cells to the rendered form (step 302). That is, the system applies a grid having a predetermined number of cells to the rendered form so that each cell is mapped to a respective portion of the rendered form.

The system assigns a numeric embedding to each cell of the grid (step 304). Generally, the numeric embedding assigned to a given cell is the numeric embedding for content from the structured document that corresponds to, i.e., is at least partially displayed in, the portion of the rendered form that is mapped to the cell. Assigning a numeric embedding to a given cell of a grid is described in more detail below with reference to FIG. 4.

The system generates a matrix representation of the structured document from the numeric embeddings by mapping each grid of the cell to a corresponding matrix entry (step 306). That is, each grid in the cell is mapped to a matrix entry that is in the same position in the matrix as the cell is in the grid. As described above, in some implementations the matrix representation includes N matrices, where N is the number of values in each numeric embedding. In these implementations, each entry of a given matrix is a value in a particular position in the corresponding numeric embedding, i.e., each matrix includes values in the same position in their corresponding numeric embeddings. That is, the entries of the i-th matrix will include values only from the i-th position in the corresponding numeric embeddings.

Figure 4:
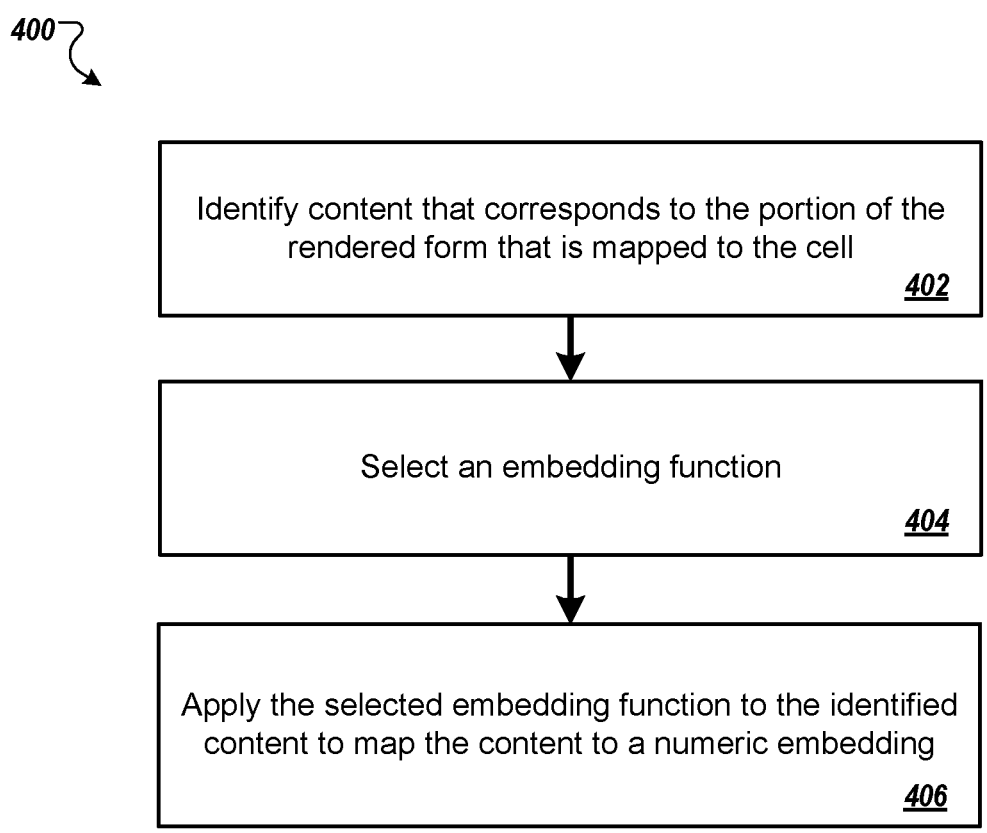
FIG. 4 is a flow diagram of an example process for assigning a numeric embedding to a cell of a grid.

FIG. 4 is a flow diagram of an example process 400 for assigning a numeric embedding to a cell of a grid. For convenience, the process 400 will be described as being performed by a system of one or more computers located in one or more locations. For example, a document processing system, e.g., the document processing system 100 of FIG. 1, appropriately programmed, can perform the process 400.

The system identifies content that corresponds to the portion of the rendered form that is mapped to the cell (step 402). In particular, the system identifies pieces of content from the structured document that are at least partially displayed in the portion of the rendered form that is mapped to the cell and then selects, from the identified pieces of content, the piece of content that makes up the largest proportion of the portion of the rendered form of any identified piece of content. For example, the system can determine which identified piece of content takes up the largest proportion of the surface area of the portion of the rendered form.

In some implementations, the system identifies only pieces of content that belong to one of a predetermined set of content types, i.e., the system does not consider for selection as the content that corresponds to the portion any content that does not belong to any of the content types in the set.

The predetermined set of content types generally includes an image content type, i.e., a content type into which the system classifies images, and one or more text content types. Depending on the implementation, the text content types can include one or more of: a term content type into which the system classifies individual terms, a phrase content type into which the system classifies sentences or other phrases, an entity content type into which the system classifies known references to entities, e.g., known names of known entities or pronouns that refer to known entities, a paragraph content type into which the system classifies paragraphs or other collections of multiple sentences, a linked web page content type into which the system classifies web pages linked to by links in the structured document, or a block of data content type into which the system classifies structured block of data, e.g., advertisements or search results.

The system selects an embedding function that is specific to the type of the identified content (step 404). Each of the embedding functions is a function that is configured to map content of a specific type or an identifier for the content of the specific type to a numeric embedding for the content in accordance with current values of a set of parameters.

The manner in which a given embedding function maps content to a numeric embedding depends on the type of content that the embedding function is specific to. Generally, however, each embedding function generates numeric embeddings that have the same fixed dimensionality, i.e., each embedding function generates numeric embeddings that each have N values.

For example, the embedding function for the image content type may be a convolutional neural network that is configured to receive an input image and to process the input image to generate a numeric embedding for the image in accordance with current values of the parameters of the convolutional neural network. An example neural network that can be used as the embedding function for images is described in Wang, Jiang, et al. "Learning fine-grained image similarity with deep ranking," Computer Vision and Pattern Recognition (CVPR), 2014 IEEE Conference on IEEE, 2014.

As another example, the embedding function for the term content type may be a function that maps each term from a vocabulary of terms to a numeric embedding for the term in accordance with current values of a set of parameters, e.g., using current values in a lookup table.

As another example, the embedding function for the entity content type may be a function that maps entity identifiers for known entities to numeric embeddings in accordance with current values with a set of parameters.

As another example, the embedding function for the phrase content type may be a recurrent neural network, e.g., a long short-term memory (LSTM) neural network, that processes each word in the phrase to generate the numeric embedding for the phrase. An example LSTM neural network that can be used as the embedding function for phrases or sentences is described in Ilya Sutskever, Oriol Vinyals, and Quoc V. Le, "Sequence to sequence learning with neural networks," *Advances in neural information processing systems*, 2014.

As another example, the embedding function for the phrase content type or for the paragraph content type may iteratively determine the numeric embedding for an input phrase or collection of sentences by training a machine learning model to predict the last word in sequences of words from the phrase or collection of sentences. An example of such an embedding function is described in "Distributed Representations of Sentences and Documents," Quoc V. Le and Tomas Mikolov, available at: http://arxiv.org/abs/1405.4053.

The system applies the selected embedding function to the identified content to map the content to a numeric embedding in accordance with the current values of the parameters of the embedding function (step 406). For example, if the content is an image, the system applies the embedding function that is specific to the image content type to map the image to a numeric embedding for the image. As another example, if the content has been identified as a phrase, the system applies the embedding function that is specific to the phrase content type to map the phrase to a numeric embedding for the phrase.

The processes 200, 300, and 400 can be performed to generate classification data for a structured document for which the desired classification, i.e., the output that should be generated by the convolutional neural network for the input, is not known. The processes 200, 300, and 400 can also be performed on documents in a set of training documents, i.e., a set of documents for which the output that should be predicted by the convolutional neural network is known, in order to train the convolutional neural network, i.e., to determine trained values for the parameters of the layers in the convolutional subnetwork and the classification subnetwork. In particular, the processes 200, 300, and 400 can be performed repeatedly on structured documents selected from a set of training documents as part of a backpropagation training technique that determines trained values for the parameters of the layers of the convolutional neural network.

In some implementations, the values of the parameters of the embedding functions are fixed, i.e., have been determined using another process. For example, a process for determining the parameters of an embedding function that maps terms to numeric embeddings is described in Mikolov, Tomas, Chen, Kai, Corrado, Greg, and Dean, Jeffrey, "Efficient estimation of word representations in vector space," arXiv preprint arXiv:1301.3781, 2013a.

In some other implementations, however, the values of the parameters are adjusted as part of training the convolutional neural network or after the convolutional neural network has been trained. In particular, the system can adjust initial values of the parameters of the embedding functions, i.e., randomly assigned values or values determined using another process, to determine trained values of the parameters of each of the embedding functions using a backpropagation training technique.

Figure 5:
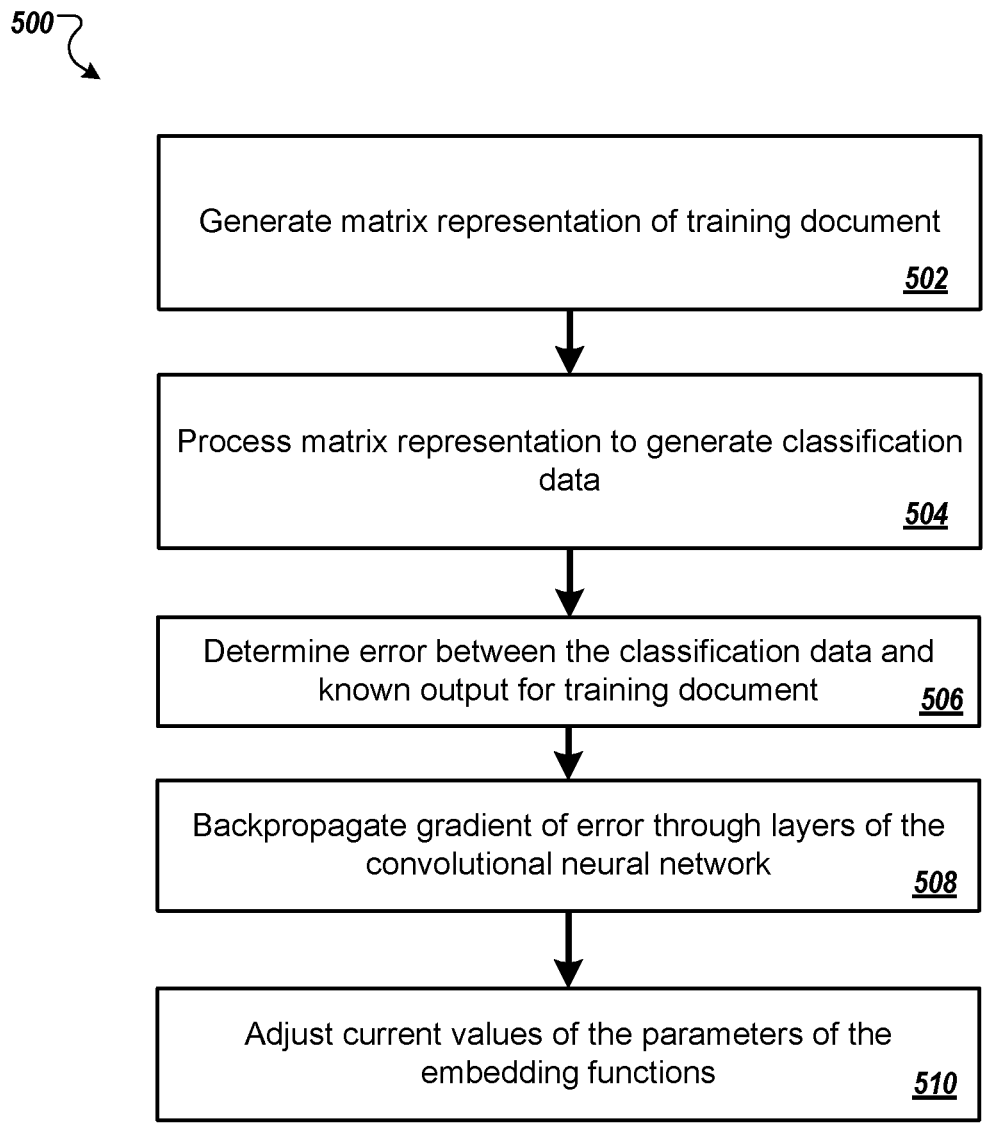
FIG. 5 is a flow diagram of an example process for adjusting the current values of the parameters of embedding functions.

FIG. 5 is a flow diagram of an example process 500 for adjusting the current values of the parameters of embedding functions. For convenience, the process 500 will be described as being performed by a system of one or more computers located in one or more locations. For example, a document processing system, e.g., the document processing system 100 of FIG. 1, appropriately programmed, can perform the process 500.

The system generates a matrix representation of a training document (step 502). That is, the system generates a matrix representation of the training document as described above with reference to FIGS. 2-4. Specifically, the system generates the values in the matrix representation by applying embedding functions to content in the training document to generate numeric embeddings of the content.

The system processes the matrix representation to generate classification data (step 504). That is, the system processes the matrix representation through the layers of the convolutional neural network that includes the convolutional subnetwork and the classification subnetwork to generate the classification data in accordance with current values of the parameters of the layers.

The system determines an error between the classification data and a known output for the training document (step 506). That is, the system determines an error between the classification data and a known classification for the training document. For example, if the convolutional neural network is configured to generate classification data that represents a likelihood of a user selecting content in a particular location in the rendered form of the structured document, the system can determine an error between the likelihood generated by the convolutional neural network and a known observed likelihood for the structured document.

The system backpropagates the error through all of the layers of the convolutional neural network (step 508), e.g., using a conventional backpropagation technique. Optionally, the system updates the current values of the parameters of the layers of the convolutional neural network using the backpropagated error at each layer of the convolutional neural network.

The system adjusts current values of the parameters of the embedding functions using the backpropagated error (step 510). That is, the system adjusts the values of the parameters of each embedding function used to generate one of the numeric embeddings of the content in the structured document so that the embeddings generated in accordance with the adjusted parameter values would result in a reduced error between the generated classification data and the known classification. The system can adjust the parameter values of each embedding function using conventional neural network training techniques, e.g., using a gradient descent training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, by one or more computers, a rendered form of a structured document, wherein the structured document comprises image content and text content;
    mapping a grid of cells to the rendered form;
    assigning a respective numeric embedding to each cell in the grid, comprising, for each cell:
        identifying content in the structured document that corresponds to a portion of the rendered form that is mapped to the cell,
        identifying, from a plurality of types of content that includes at least one image content type and at least one text content type, a type of content associated with the identified content;
        mapping the identified content to a numeric embedding for the identified content using an embedding function that is specific to the type of content associated with the identified content, and
        assigning the numeric embedding for the identified content to the cell;
    generating a matrix representation of the structured document from the numeric embeddings assigned to the cells of the grids, wherein the matrix representation reflects the relative location of content from the structured document when the structured document is in the rendered form, wherein the matrix representation comprises a plurality of entries, each entry corresponding to a different location in the rendered form of the structured document, and the generating comprising:
        mapping each numeric embedding to an entry that corresponds to the location of the corresponding identified content in the rendered form of the structure document; and
    generating neural network features of the structured document by processing the matrix representation of the structured document through a subnetwork comprising one or more convolutional neural network layers, wherein the neural network features reflect the relative location of content from the structured document when the structured document is in the rendered form.

2. The method of claim 1, further comprising:
    processing the neural network features through one or more additional neural network layers to generate classification data for the structured document.

3. The method of claim 1, wherein identifying content in the structured document that corresponds to a portion of the rendered form that is mapped to the cell comprises:
    identifying one or more pieces of content that are at least partially displayed in the portion of the rendered form that is mapped to the cell and that are of one of the plurality of content types; and
    selecting a piece of content of the one or more pieces of content that makes up a largest proportion of the portion of the rendered form.

4. The method of claim 3, wherein mapping the identified content to a numeric embedding for the identified content comprises:
    selecting an embedding function from a plurality of embedding functions that are each specific to content of a corresponding content type, wherein each embedding function is configured to receive content of the corresponding content type or an identifier for the content of the corresponding content type and to map the content of the corresponding content type to a numeric embedding for the content of the corresponding content type in accordance with current values of a set of parameters for the embedding function; and
    mapping the identified content to the numeric embedding for the identified content by applying the selected embedding function to the identified content.

5. The method of claim 3, wherein the structured document is associated with a known classification, the method further comprising:
    processing the neural network features through one or more additional neural network layers to generate classification data for the structured document;
    determining an error between the generated classification data and the known classification;

backpropagating the error through all of the additional neural network layers and all of the layers of the convolutional subnetwork; and adjusting the current values of the parameters of the embedding function using the backpropagated error.

6. The method of claim 1, wherein each numeric embedding comprises N values, wherein N is an integer greater than one.

7. The method of claim 6, wherein the matrix representation comprises N matrices, and wherein each matrix includes a respective value from each numeric embedding, and wherein the respective values are each in the same position in the numeric embeddings.

8. A system comprising one or more computers and one or more storage devices storing instructions that when executed by the one or more computers cause the one or more computers to perform operations comprising:
 receiving, by one or more computers, a rendered form of a structured document, wherein the structured document comprises image content and text content;
 mapping a grid of cells to the rendered form;
 assigning a respective numeric embedding to each cell in the grid, comprising, for each cell:
  identifying content in the structured document that corresponds to a portion of the rendered form that is mapped to the cell,
  identifying, from a plurality of types of content that includes at least one image content type and at least one text content type, a type of content associated with the identified content;
  mapping the identified content to a numeric embedding for the identified content using an embedding function that is specific to the type of content associated with the identified content, and
  assigning the numeric embedding for the identified content to the cell;
 generating a matrix representation of the structured document from the numeric embeddings assigned to the cells of the grids, wherein the matrix representation reflects the relative location of content from the structured document when the structured document is in the rendered form, wherein the matrix representation comprises a plurality of entries, each entry corresponding to a different location in the rendered form of the structured document, and the generating comprising:
  mapping each numeric embedding to an entry that corresponds to the location of the corresponding identified content in the rendered form of the structure document; and
 generating neural network features of the structured document by processing the matrix representation of the structured document through a subnetwork comprising one or more convolutional neural network layers, wherein the neural network features reflect the relative location of content from the structured document when the structured document is in the rendered form.

9. The system of claim 8, the operations further comprising:
 processing the neural network features through one or more additional neural network layers to generate classification data for the structured document.

10. The system of claim 8, wherein identifying content in the structured document that corresponds to a portion of the rendered form that is mapped to the cell comprises:
 identifying one or more pieces of content that are at least partially displayed in the portion of the rendered form that is mapped to the cell and that are of one of the plurality of content types; and
 selecting a piece of content of the one or more pieces of content that makes up a largest proportion of the portion of the rendered form.

11. The system of claim 10, wherein mapping the identified content to a numeric embedding for the identified content comprises:
 selecting an embedding function from a plurality of embedding functions that are each specific to content of a corresponding content type, wherein each embedding function is configured to receive content of the corresponding content type or an identifier for the content of the corresponding content type and to map the content of the corresponding content type to a numeric embedding for the content of the corresponding content type in accordance with current values of a set of parameters for the embedding function; and
 mapping the identified content to the numeric embedding for the identified content by applying the selected embedding function to the identified content.

12. The system of claim 10, wherein the structured document is associated with a known classification, the method further comprising:
 processing the neural network features through one or more additional neural network layers to generate classification data for the structured document;
 determining an error between the generated classification data and the known classification;
 backpropagating the error through all of the additional neural network layers and all of the layers of the convolutional subnetwork; and
 adjusting the current values of the parameters of the embedding function using the backpropagated error.

13. The system of claim 8, wherein each numeric embedding comprises N values, wherein N is an integer greater than one.

14. The system of claim 13, wherein the matrix representation comprises N matrices, and wherein each matrix includes a respective value from each numeric embedding, and wherein the respective values are each in the same position in the numeric embeddings.

15. A computer program product encoded on one or more non-transitory computer storage media, the computer program product comprising instructions that when executed by one or more computers cause the one or more computers to perform operations comprising:
 receiving, by one or more computers, a rendered form of a structured document, wherein the structured document comprises image content and text content;
 mapping a grid of cells to the rendered form;
 assigning a respective numeric embedding to each cell in the grid, comprising, for each cell:
  identifying content in the structured document that corresponds to a portion of the rendered form that is mapped to the cell,
  identifying, from a plurality of types of content that includes at least one image content type and at least one text content type, a type of content associated with the identified content;
  mapping the identified content to a numeric embedding for the identified content using an embedding function that is specific to the type of content associated with the identified content, and
  assigning the numeric embedding for the identified content to the cell;

generating a matrix representation of the structured document from the numeric embeddings assigned to the cells of the grids, wherein the matrix representation reflects the relative location of content from the structured document when the structured document is in the rendered form, wherein the matrix representation comprises a plurality of entries, each entry corresponding to a different location in the rendered form of the structured document, and the generating comprising:
  mapping each numeric embedding to an entry that corresponds to the location of the corresponding identified content in the rendered form of the structure document; and
generating neural network features of the structured document by processing the matrix representation of the structured document through a subnetwork comprising one or more convolutional neural network layers, wherein the neural network features reflect the relative location of content from the structured document when the structured document is in the rendered form.

16. The computer program product of claim 15, the operations further comprising:
  processing the neural network features through one or more additional neural network layers to generate classification data for the structured document.

17. The computer program product of claim 15, wherein identifying content in the structured document that corresponds to a portion of the rendered form that is mapped to the cell comprises:
  identifying one or more pieces of content that are at least partially displayed in the portion of the rendered form that is mapped to the cell and that are of one of the plurality of content types; and
  selecting a piece of content of the one or more pieces of content that makes up a largest proportion of the portion of the rendered form.

18. The computer program product of claim 17, wherein mapping the identified content to a numeric embedding for the identified content comprises:
  selecting an embedding function from a plurality of embedding functions that are each specific to content of a corresponding content type, wherein each embedding function is configured to receive content of the corresponding content type or an identifier for the content of the corresponding content type and to map the content of the corresponding content type to a numeric embedding for the content of the corresponding content type in accordance with current values of a set of parameters for the embedding function; and
  mapping the identified content to the numeric embedding for the identified content by applying the selected embedding function to the identified content.

19. The computer program product of claim 17, wherein the structured document is associated with a known classification, the method further comprising:
  processing the neural network features through one or more additional neural network layers to generate classification data for the structured document;
  determining an error between the generated classification data and the known classification;
  backpropagating the error through all of the additional neural network layers and all of the layers of the convolutional subnetwork; and
  adjusting the current values of the parameters of the embedding function using the backpropagated error.

20. The computer program product of claim 15, wherein each numeric embedding comprises N values, wherein N is an integer greater than one, wherein the matrix representation comprises N matrices, and wherein each matrix includes a respective value from each numeric embedding, and wherein the respective values are each in the same position in the numeric embeddings.

* * * * *